United States Patent
Bennett

(10) Patent No.: US 6,810,443 B2
(45) Date of Patent: Oct. 26, 2004

(54) OPTICAL STORAGE TRANSFER PERFORMANCE

(75) Inventor: Joseph A. Bennett, Roseville, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/335,049

(22) Filed: Dec. 31, 2002

(65) Prior Publication Data

US 2004/0128409 A1 Jul. 1, 2004

(51) Int. Cl.$^7$ .............................................. G06F 13/14
(52) U.S. Cl. .......................... 710/22; 710/33; 710/52; 711/100; 711/101
(58) Field of Search .............................. 710/22, 33, 52; 711/100, 101

(56) References Cited

U.S. PATENT DOCUMENTS

| | | | |
|---|---|---|---|
| 5,063,498 A | | 11/1991 | Hirahara et al. |
| 5,432,801 A | * | 7/1995 | Hepler ........................ 714/755 |
| 5,664,224 A | * | 9/1997 | Davis ........................... 710/22 |
| 5,890,002 A | * | 3/1999 | Li et al. ...................... 710/260 |
| 6,085,278 A | | 7/2000 | Gates et al. |
| 6,651,113 B1 | * | 11/2003 | Grimsrud ..................... 710/22 |

OTHER PUBLICATIONS

Serial ATA Workgroup, "Serial ATA: High Speed Serialized AT Attachment", product design specification, revision 1.0, 311 pages including cover (Aug. 29, 2001).

* cited by examiner

Primary Examiner—A. Elamin
(74) Attorney, Agent, or Firm—Blakely, Sokoloff, Taylor & Zafman LLP

(57) ABSTRACT

One embodiment involves having a processor write a data transfer command to cacheable system memory. The processor then performs a write transaction to a deliver a "packet" command to an optical storage device. The optical storage device responds to the packet command by issuing an interrupt once the optical storage device has processed the packet command. The issuance of the interrupt indicates that the optical storage device is ready to receive a data transfer command. A host controller that is coupled to the optical storage device via a serial interconnect receives the interrupt. The host controller then causes a DMA transfer to occur which reads the data transfer command located in system memory and delivers the data transfer command to the optical storage device. The processor is not involved in servicing the interrupt and is therefore freed up to perform other tasks and overall system performance is improved.

15 Claims, 2 Drawing Sheets

OPTICAL STORAGE TRANSFER PERFORMANCE

FIELD OF THE INVENTION

The present invention pertains to the field of computer systems. More particularly, this invention pertains to the field of programming optical storage devices for data transfer.

BACKGROUND OF THE INVENTION

Typical computer systems utilize disk drives for mass storage. A disk drive is usually coupled to a host controller that resides in a system logic device. The disk drive is coupled to the host controller via an interconnect. One such interconnect is an AT Attachment (ATA) interconnect. The host controller communicates with the disk drive over the ATA interconnect.

One type of mass storage device includes optical storage devices. Examples of optical storage devices include digital video disks (DVD), read-only compact disks (CD-ROM), etc. Typical computer systems communicate with these optical storage devices via an ATA packet interface (ATAPI). When a processor wishes cause a data transfer from an optical storage device, it first issues a "packet" command to the optical storage device. The packet command is a command that complies with the ATA protocol and informs the optical storage device that the processor wishes to deliver a block of data to the optical storage device that includes command programming information for a data transfer. Once the optical storage device processes the packet command, it will issue an interrupt indicating that the storage device is ready to receive the actual data transfer command information. Then, the processor delivers the data transfer command information to the optical storage device. In order to deliver the data transfer command to the optical storage device, it will perform a series of word write cycles (up to 12 bytes).

So, programming an optical storage device in order to initiate a data transfer from the optical storage device is a two step process including first issuing the packet command and then delivering the data transfer command. In prior systems, the processor is involved in both of these steps. The processor spends a significant amount of time servicing the interrupts that occur for every optical storage device data transfer, and overall system performance is degraded.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment involves having a processor write a data transfer command to cacheable system memory. The processor then performs a write transaction to a deliver a "packet" command to an optical storage device. The optical storage device responds to the packet command by issuing an interrupt once the optical storage device has processed the packet command. The issuance of the interrupt indicates that the optical storage device is ready to receive a data transfer command. A host controller that is coupled to the optical storage device via a serial interconnect receives the interrupt. The host controller then causes a DMA transfer to occur which reads the data transfer command located in system memory and delivers the data transfer command to the optical storage device. The processor is not involved in servicing the interrupt (transferring the data transfer command to the optical storage device) and is therefore freed up to perform other tasks and overall system performance is improved.

Figure 1:
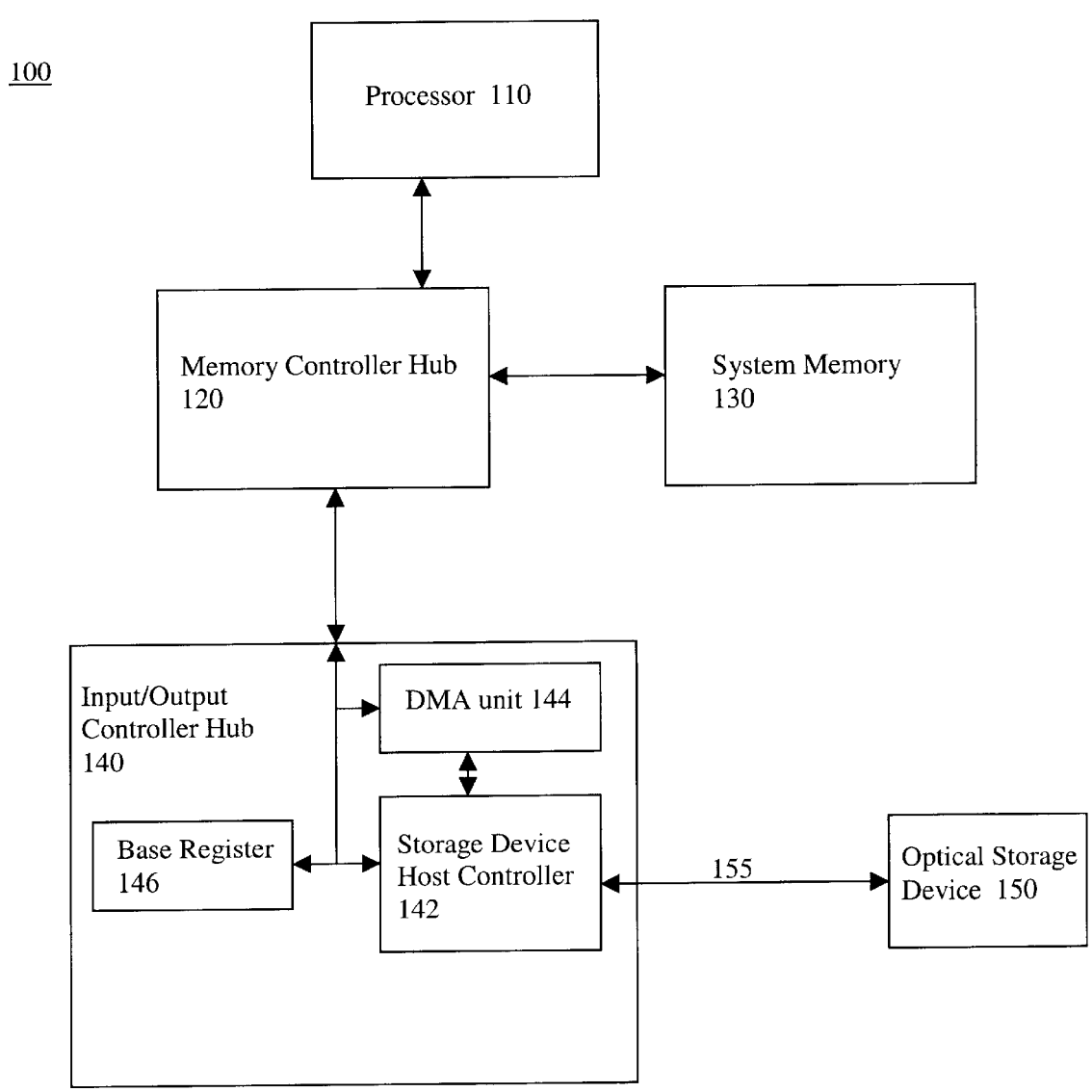
FIG. 1 is a block diagram of a computer system including an input/output controller hub that includes a direct memory access (DMA) unit and a host controller coupled to an optic storage device.

FIG. 1 is a block diagram of a computer system 100 including an input/output controller hub 140 that includes a direct memory access (DMA) unit 144 and a storage device host controller 142, as well as a base register 146 to store a system memory address. The system 100 further includes a processor 110, a memory controller hub 120, and a system memory 130. The processor 110 communicates with the input/output hub 140 or the system memory 130 through the memory controller hub 120. One embodiment may include a processor from the family of Pentium® processors from Intel® Corporation. Other embodiments may use other types of processors or micro-controllers.

The system 100 also includes an optical storage device 150 coupled to the storage device host controller 142 via an interconnect 155. For this embodiment, the interconnect 155 is a serial ATA interconnect, although other embodiments are possible using other types of interconnects. The optical storage device 150 in this example embodiment may be a DVD drive, a CD-ROM drive, or any of several types of optical storage devices. For this example, the storage device host controller 142 communicates with the optical storage device 150 over the serial ATA interconnect 155 using the ATAPI protocol.

The configuration of the system 100 is only one of a wide variety of configurations possible.

In the current example embodiment, when the optical storage device 150 needs to be programmed in order to initiate a data transfer, the processor 110 first writes a data transfer command to a location in the system memory 130. The data transfer command may include as much as 12 bytes of information, although other embodiments are possible using other lengths. The processor 110 also programs the base register 146 within the input/output controller hub 140 with an address that indicates the location of the data transfer command in system memory 130. The processor 110 then writes a "packet" command to the optical storage device 150. The optical storage device 150 processes the packet command and then issues an interrupt message over the interconnect 155 to indicate that the optical storage device 150 is ready to receive a data transfer command.

The interrupt message from the optical storage device 150 is received by the storage device host controller 142. The host controller 142, in response to the interrupt, performs a DMA transaction using the DMA unit 144 that reads the data transfer command from the location in system memory 130 indicated by the contents of the base register 146 and delivers the data transfer command to the optical storage device 150 which then proceeds to process the data transfer command.

Figure 2:
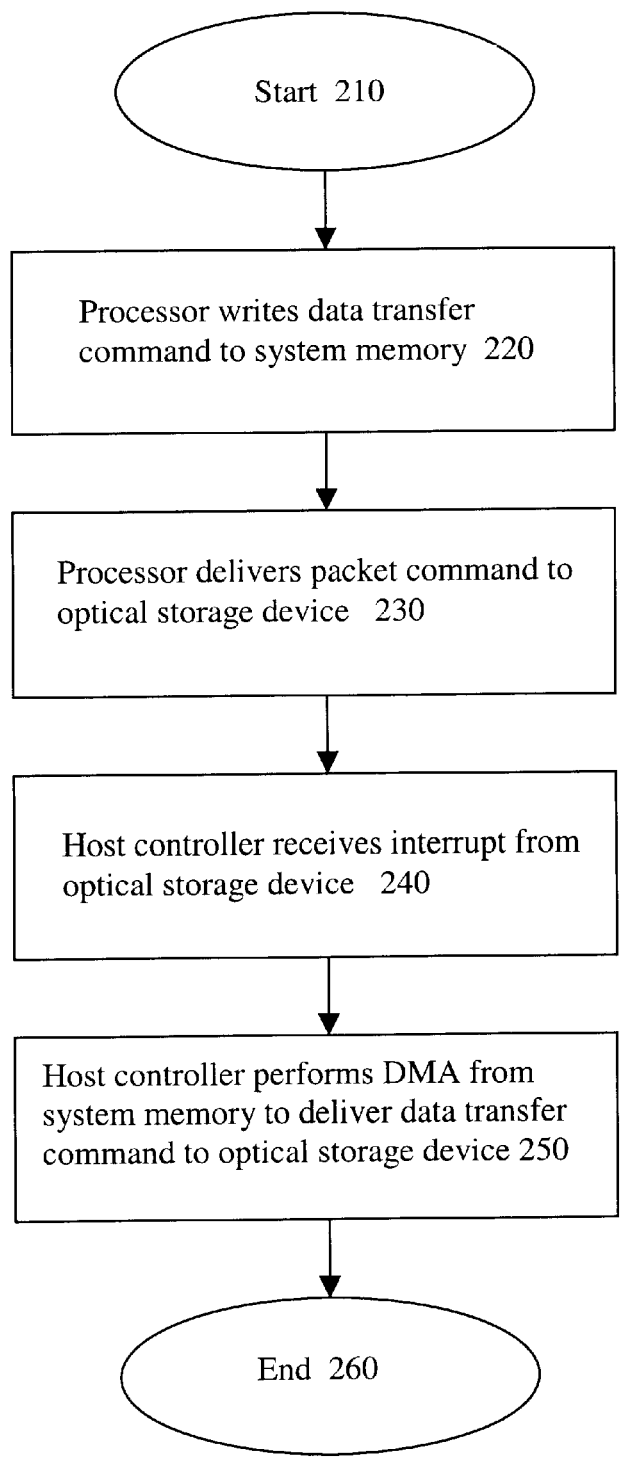
FIG. 2 is a flow diagram of a method for improving ATAPI programming times.

FIG. 2 is a flow diagram of one embodiment of a method for improving ATAPI device programming times. The process begins at block 210. At block 220, a processor writes a data transfer command to system memory. The processor then delivers a packet command to an optical storage device at block 230. At block 240, a host controller receives an interrupt message from the optical storage device. In response to the interrupt message, the host controller performs a DMA transaction from system memory to deliver the data transfer command to the optical storage device at block 250. The process ends at block 260.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a storage device host controller to deliver a packet command received from a processor to an optical storage device over an interconnect, the storage device host controller to later receive an interrupt signal from the optical storage device; and
   a direct memory access unit to retrieve a data transfer command from a system memory in response to the storage device host controller receiving the interrupt signal, the storage device host controller to then deliver the data transfer command to the optical storage device.

2. The apparatus of claim 1, wherein the interconnect is a serial interconnect.

3. The apparatus of claim 2, including a data transfer command base register to store a data transfer command address, the address indicating a location in system memory.

4. The apparatus of claim 3, the data transfer command including as many as 12 bytes of command information.

5. The apparatus of claim 4, wherein the interconnect is a serial ATA interconnect.

6. A system, comprising:
   a processor;
   a memory controller hub coupled to the processor;
   a system memory coupled to the memory controller hub;
   an optical storage device; and
   a system logic device coupled to the memory controller hub and the system logic device coupled to the optical storage device via an interconnect, the system logic device including
      a storage device host controller to deliver a packet command received from the processor to the optical storage device over an interconnect, the storage device host controller to later receive an interrupt signal from the optical storage device; and
      a direct memory access unit to retrieve a data transfer command from the system memory in response to the storage device host controller receiving the interrupt signal, the storage device host controller to then deliver the data transfer command to the optical storage device.

7. The system of claim 6, wherein the interconnect is a serial interconnect.

8. The system of claim 7, including a data transfer command base register to store a data transfer command address, the address indicating a location in system memory.

9. The system of claim 8, the data transfer command including as many as 12 bytes of command information.

10. The system of claim 9, wherein the interconnect is a serial ATA interconnect.

11. A method, comprising:
    storing a data transfer command in a system memory;
    delivering a packet command to on optical storage device;
    receiving an interrupt signal from the optical storage device at a storage device host controller; and
    performing a direct memory access transaction to deliver the data transfer command from the system memory to the optical storage device.

12. The method of claim 11, wherein performing the direct memory access transaction includes retrieving the data transfer command from a location in the system memory indicated by the contents of a data transfer command base register.

13. The method of claim 12, further including a processor programming the data transfer command register with the location of the data transfer command in system memory.

14. The method of claim 13, wherein performing a direct memory access transaction includes the storage device host controller managing the direct memory access transaction.

15. The method of claim 14, wherein delivering a packet command to the optical storage device includes the processor initiating the delivering of the packet command to the optical storage device.

* * * * *

UNITED STATES PATENT AND TRADEMARK OFFICE
CERTIFICATE OF CORRECTION

PATENT NO.    : 6,810,443 B2
DATED         : October 26, 2004
INVENTOR(S)   : Bennett It is certified that error appears in the above-identified patent and that said Letters Patent is hereby corrected as shown below:

Column 1,
Line 59, delete "optic" and insert -- optical --.

Signed and Sealed this

Twenty-eighth Day of June, 2005

JON W. DUDAS
*Director of the United States Patent and Trademark Office*